Figure 1:
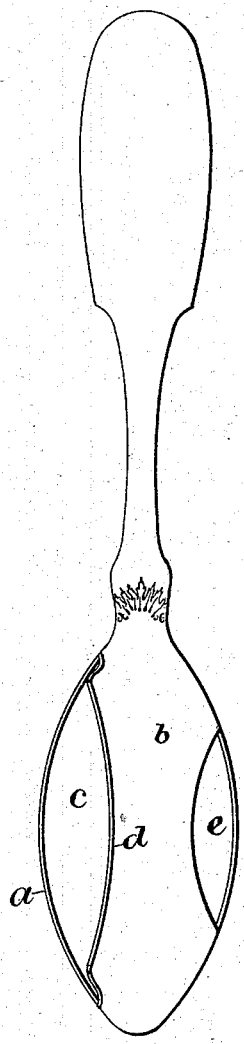

(No Model.)

I. W. PARMENTER.
MUSTACHE SPOON.

No. 291,394. Patented Jan. 1, 1884.

ATTEST:
J. A. Murdle
N. H. Bradshaw

INVENTOR:
I. W. Parmenter
Pr J. A. Murdle
att'y

United States Patent Office.

ISAAC WARREN PARMENTER, OF NEW YORK, N. Y.

MUSTACHE-SPOON.

SPECIFICATION forming part of Letters Patent No. 291,294, dated January 1, 1884.

Application filed July 9, 1883. (No model.)

*To all whom it may concern:*

Be it known that I, ISAAC W. PARMENTER, a citizen of the United States, and a resident of New York, in the county of New York and State of New York, have invented certain new and useful Improvements in Table-Spoons, of which the following is a specification.

My invention relates to a table-spoon provided with means for protecting the mustache and preventing the same from coming in contact with soup when partaking of the same.

My invention consists of a spoon provided with a cover having an aperture in the same near the edge of the bowl of the spoon, through which the soup passes to the mouth. This opening I term the "outlet." The cover is also provided with a larger aperture, which I term the "inlet." This opening is provided with a flange slightly curved and projecting upward from the cover, and serves as a protector for the mustache. The cover here is represented as being rigidly fixed to the bowl of the spoon; but I may have the cover fastened to the spoon by means of a spring-hinge. I may also have the cover with a shank arranged on the handle of the spoon, so as to adjust the same, and which may be held in a fixed position by means of a clamping device; but I prefer to use it as represented in the drawings, with slight variations.

Figure 2:
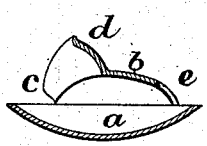

In the drawings, Figure 1 represents a plan view. Fig. 2 represents a transverse section.

Similar letters refer to similar parts throughout the drawings, in which—

*a* represents the bowl of the spoon.

*b* represents the cover. *c* represents the inlet, *d* is the projecting flange, and *e* is the outlet.

When dipping the spoon in the liquor or soup, the inlet portion of the spoon is turned downward, and by turning the hand slightly the bowl of the spoon is filled.

It will be obvious that the soup contained in the bowl of the spoon cannot come in contact with the mustache, from the fact that it is completely inclosed by the cover.

I am aware that table-spoons have heretofore been made with a longitudinal bridge on and over the bowl of the spoon.

I am also aware that they have been made with a bridge extending crosswise thereon; but I am not aware that a table-spoon has ever been made with a vertically-projecting rim on the bridge, whereby the mustache is prevented from coming in contact with the soup in the bowl of the spoon.

Having thus described my invention, what I claim as new, and desire to secure by Letters Patent, is—

In a table-spoon having a cover attached thereto, provided with an outlet and inlet, the cover having a vertically-projecting flange at the inlet, substantially as shown and described.

Signed at New York, in the county of New York and State of New York, this 7th day of July, A. D. 1883.

ISAAC WARREN PARMENTER.

Witnesses:
J. A. HURDLE,
HENRY F. LIPPOLD.